(12) United States Patent
Dreps et al.

(10) Patent No.: US 9,324,030 B2
(45) Date of Patent: Apr. 26, 2016

(54) SYSTEM INTERCONNECT DYNAMIC SCALING BY PREDICTING I/O REQUIREMENTS

(71) Applicant: INTERNATIONAL BUSINESS MACHINES CORPORATION, Armonk, NY (US)

(72) Inventors: Daniel Mark Dreps, Georgetown, TX (US); Frank D. Ferraiolo, Naples, FL (US); Anand Haridass, Bangalore (IN); Prasanna Jayaraman, Bangalore (IN); David John Krolak, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 117 days.

(21) Appl. No.: 14/147,746

(22) Filed: Jan. 6, 2014

(65) Prior Publication Data
US 2015/0193690 A1    Jul. 9, 2015

(51) Int. Cl.
*G06F 12/00*    (2006.01)
*G06N 7/00*    (2006.01)
(Continued)

(52) U.S. Cl.
CPC .............. *G06N 7/005* (2013.01); *G06F 1/3206* (2013.01); *G06F 1/3234* (2013.01); *G06F 1/3278* (2013.01); *G06F 9/45558* (2013.01); *G06F 2009/45579* (2013.01); *G06F 2009/45591* (2013.01)

(58) Field of Classification Search
CPC .... G06F 1/3234; G06F 9/45558; G06N 7/005
See application file for complete search history.

(56) References Cited

U.S. PATENT DOCUMENTS 6,134,676 A * 10/2000 VanHuben et al. .............. 714/39
6,496,925 B1 * 12/2002 Rodgers et al. ................ 712/244
7,080,288 B2   7/2006 Ferraiolo et al.
(Continued)

FOREIGN PATENT DOCUMENTS

JP    2009259217 A    11/2009
JP    2011181006 A    9/2011

OTHER PUBLICATIONS

U.S. Appl. No. 14/253,916, filed Apr. 16, 2014, Dreps, et al.
(Continued)

*Primary Examiner* — Henry Tsai
*Assistant Examiner* — John Roche
(74) *Attorney, Agent, or Firm* — Mitch Harris, Atty at Law, LLC; Andrew M. Harris; Steven L. Bennett

(57) ABSTRACT

Interface management techniques provide reduced power consumption along with reducing heat and EMI generation in a computer system having multiple interconnected processing units. Physical link layers of external interfaces that interconnect the processing units of have dynamically adjustable bandwidth and the bandwidths are dynamically adjusted by predicting interface bandwidth requirements. An interface controller detects events other than I/O requests that occur in a processing unit that are indicators of potential future transactions on one of the external interfaces connected to the processing unit. The interface controller predicts, from the detected events, that future transactions will likely occur on the interface, and in response, controls the dynamically adjustable bandwidth of physical link layer of the interface to accommodate the future transactions.

18 Claims, 4 Drawing Sheets

(51) Int. Cl.
  *G06F 1/32* (2006.01)
  *G06F 9/455* (2006.01)

(56) References Cited

U.S. PATENT DOCUMENTS

| 7,116,682 | B1* | 10/2006 | Waclawsky et al. | 370/468 |
| 7,117,126 | B2 | 10/2006 | Floyd et al. | |
| 7,613,126 | B1* | 11/2009 | Natarajan et al. | 370/252 |
| 7,721,039 | B2 | 5/2010 | Irisa | |
| 8,050,174 | B2 | 11/2011 | Becker et al. | |
| 2003/0088799 | A1 | 5/2003 | Bodas | |
| 2003/0202482 | A1* | 10/2003 | Dittmann et al. | 370/252 |
| 2005/0119860 | A1 | 6/2005 | Hsu et al. | |
| 2010/0082851 | A1* | 4/2010 | Green et al. | 710/29 |
| 2011/0055370 | A1* | 3/2011 | Kern et al. | 709/224 |
| 2011/0222111 | A1 | 9/2011 | Shima | |
| 2013/0159761 | A1 | 6/2013 | Baumgartner et al. | |

OTHER PUBLICATIONS

U.S. Appl. No. 14/302,628, filed Jun. 12, 2014, Dreps, et al.
U.S. Appl. No. 14/299,415, filed Jun. 9, 2014, Dreps, et al.
U.S. Appl. No. 14/462,278, filed Aug. 18, 2014, Dreps, et al.
U.S. Appl. No. 14/464,924, filed Aug. 21, 2014, Dreps, et al.
Office Action in U.S. Appl. No. 14/299,415 mailed on Jul. 1, 2015, 36 pages (pp. 1-36 in pdf).

* cited by examiner

US 9,324,030 B2

SYSTEM INTERCONNECT DYNAMIC SCALING BY PREDICTING I/O REQUIREMENTS

BACKGROUND OF THE INVENTION

1. Field of the Invention

The present invention relates generally to interconnected processing systems, and more particularly, to processing systems that dynamically control I/O interface performance based on a prediction of I/O requirements.

2. Description of Related Art

Interfaces within and between present-day integrated circuits have increased in operating frequency and width. In particular, in multiprocessing systems, both wide and fast connections are provided between many processing units. Data width directly affects the speed of data transmission between systems components, as does the data rate, which is limited by the maximum frequency that can be supported by an interface. However, such fast and wide interconnects are significant power consumers in a computer system formed from interconnected processing units.

The processing units in a multi-processing system, particularly a symmetric multi-processing system (SMP) may need to communicate at any time, since, for example, when close affinity is provided between processors, a processor might access memory that is located on a remote node, but that is otherwise available in the processor's memory space. Therefore, for the above and other reasons, present-day multi-processing systems typically keep the physical layer of the interfaces operational and cycle idle data patters on the interconnects in order to maintain calibration of the links when transmissions are not being made over the interface physical layer. However, such operation wastes power, generates heat, and raises background noise levels (electromagnetic emissions) in the system. The alternative of placing the interface physical layers in a power-managed state would lead to unacceptable latency for transactions.

It is therefore desirable to provide an interface and computer system that more effectively manage the state of interface physical link layers in a multi-processing system to reduce power consumption and background noise levels.

BRIEF SUMMARY OF THE INVENTION

The above-mentioned objective of providing improved performance and/or power efficiency of a system interconnect physical layer between processing units is provided in a a computer system, a computer program product and an interface controller.

The computer system, computer program product and interface controller manage the state of a physical link layer of external interfaces that interconnect processing units of the computer system. The physical link layers have dynamically adjustable bandwidth. The method detects events other than I/O requests that occur in a processing unit that are indicators of potential future transactions on one of the external interfaces connected to the processing unit. The method predicts, from the detected events, that future transactions will likely occur on the interface, and in response, controls the dynamically adjustable bandwidth of physical link layer of the interface to accommodate the future transactions by increasing the dynamically adjustable bandwidth of the first physical link layer interface. After the future transactions have occurred, the dynamically adjustable bandwidth of first physical link layer is restored to a lower value.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention encompasses techniques for controlling the bandwidth, including the width and/or frequency of links, such as parallel busses or serial connections, that interconnect processing units in a processing system. Non I/O (input/output) transaction events occurring within the processing units are used to predict when I/O transactions are likely to occur over the links and the prediction is used to control the bandwidth of the links to accommodate the predicted transactions. The techniques thus can reduce power consumption and radiated emissions by maintaining the links in a lower power or inactive state between use.

Figure 1:
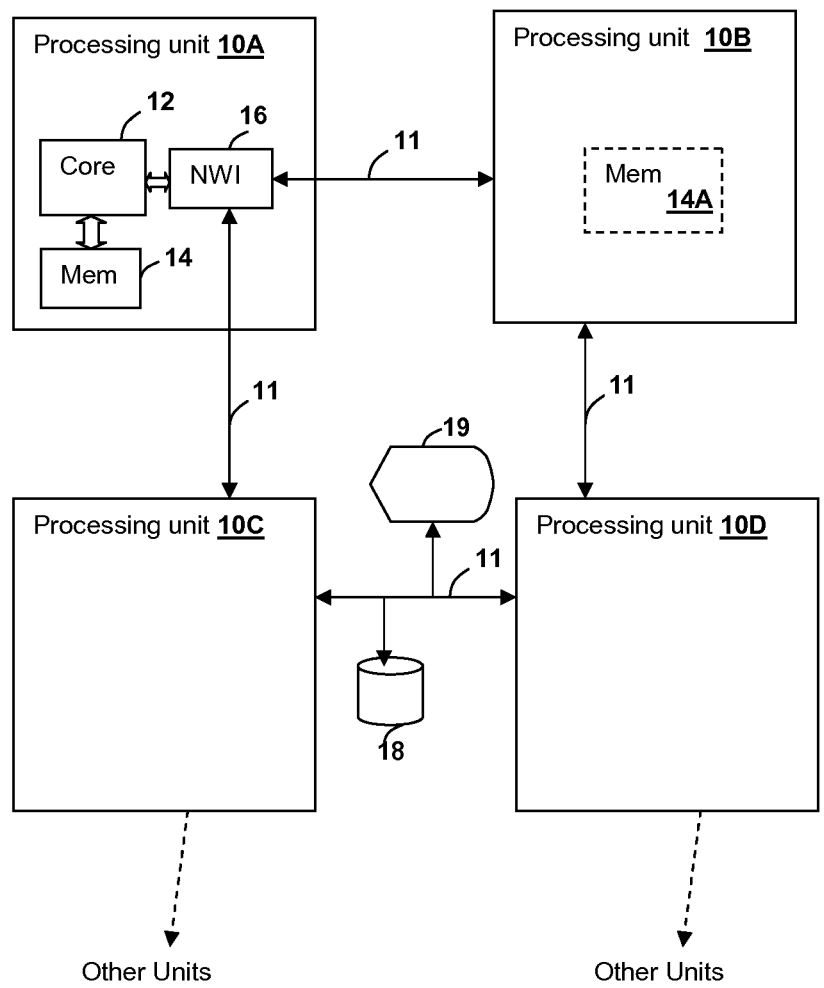
FIG. 1 is a block diagram of a computer system in which techniques in accordance with embodiments of the invention are implemented.

With reference now to the figures, and in particular with reference to FIG. 1 a distributed computer system in accordance with an embodiment of the present invention is shown. A first processing unit 10A includes a processor core 12 coupled to a memory 14 that stores program instructions for execution by processor 12. The program instructions may include program instructions forming computer program products that perform portions of the techniques disclosed herein within processing units 10A-10D. Processing unit 10A also includes a network interface (NWI) 16 that couples processing unit 10A to interface links 11, which are wired or wireless links to other processing units 10B, 10C, and provide for access between processing unit 10A and resources such as remote memory 14A within processing unit 10B. Links 11 have dynamically adjustable bandwidth/power consumption, which is controlled as disclosed below. Other processing units 10B-10D are of identical construction in the exemplary embodiment, but embodiments of the invention may be practiced in asymmetric distributed systems having processing units with differing features. The distributed computer system of FIG. 1 also includes other resources such as I/O devices 19, including graphical display devices, printers, scanners, keyboards, mice, which may be coupled to the links 11 or one of nodes 10A-10D. Processing units 10A-10D are also coupled to storage devices 18, for storing and retrieving data and program instructions, such as storing computer program products in accordance with an embodiment of the invention.

Figure 2:
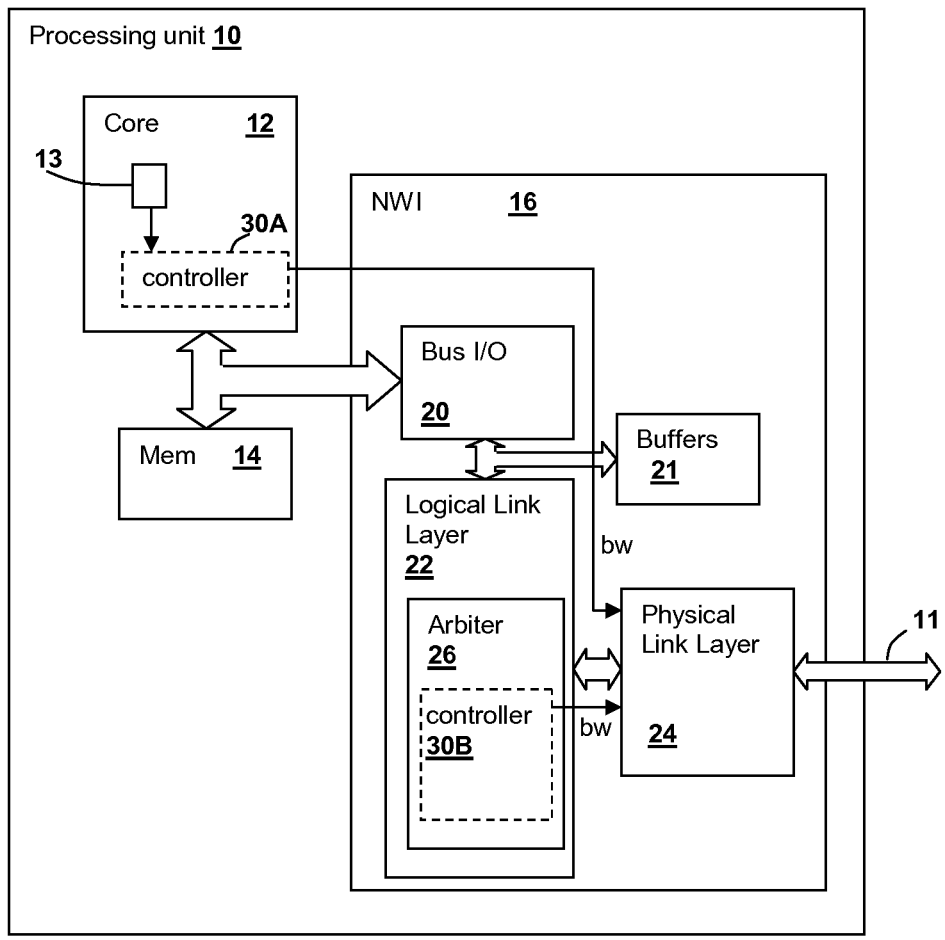
FIG. 2 is a block diagram showing details of a processing unit 10 that can be used to implement processing units 10A-10D of FIG. 1.

Referring now to FIG. 2, details within a processing unit 10 that can be used to implement processing units 10A-10D are shown. Within processing unit, controllers 30A, 30B are shown to illustrate two possible locations of a controller that manages the bandwidth of a physical link layer 24 of interface 11 according to one or more control signals bw. Within one or more of core 12, memory 14 and network interface 16, logic, control logic detects events that are indicative of future external bus transactions that are likely to be issued over interface 11. For example, a controller 30A within core 12 might detect that certain instructions are being executed, or memory ranges are being read or written, that correspond to operations that will generate I/O transactions over interface 11. For example, controller 30A may detect that a direct-memory access (DMA) buffer is being allocated, or a DMA channel being initialized in bus I/O unit 20 or elsewhere within processing unit 10 for transfer to buffers 21 that supply data to, or receive data from, a logical link layer 22 of network interface 16. Controller 30A may be coupled to one or more trace array units 13 within core 12 to capture state information that is indicative of the events, and use the state information contained in the trace array to provide detected events as input for predicting a required bandwidth of interface 11 in the near future. System level events such as a hypervisor executing within processing unit 10 starting a thread with an association to remote memory, or the association of remote memory to a running thread can be used to predict and trigger an increase in link bandwidth between the core on which the thread is running and the location of the remote memory, so that when the inevitable memory accesses by the thread occur, the link is operating at sufficient bandwidth. Similarly, a controller 30B within arbiter 26 of logical link layer 22 may detect that the logical link layer 22, and thus interface 11 is being arbitrated for and therefore physical link layer 24 will soon need to be active for a number of transactions. In another example, controller 30B may count idle cycles of logical link layer 22 to determine a required bandwidth for physical link layer 24. Alternatively, or in combination, controller 30B within network interface 16 (whether or not within arbiter 26) might also be connected to detect activity in buffers 21 with write operations anticipating upcoming output operations, or initialization of the buffer indicating a future read transaction that will be commanded by core 12 or another actor within processing unit 10.

Processing unit 10 of FIG. 2 is used to illustrate control of one of links 11 between two of processing units 10A-10D, but the techniques of the present invention extend to connection of memories, peripherals and other functional units within a computer system or other electronic device and are not to be construed as limiting as to the particular system in which they are implemented. Links 11 between processing units 10A-10D are, in the example, made by a uni-directional physical layer interconnect of wired signals connected between processing units 10A-10D, however, the techniques of the present invention extend to non-physically connected (wireless) interfaces having multiple datapaths and to bi-directional interfaces, as well. In order to support the adjustable bandwidth of links 11, processing units 10A-10D may include elastic interface (EI) units with adjustable operating frequency and/or selectable width as described in detail in U.S. Pat. No. 8,050,174 entitled "SELF HEALING CHIP-TO-CHIP INTERFACE", U.S. Pat. No. 7,117,126 entitled "DATA PROCESSING SYSTEM AND METHOD WITH DYNAMIC IDLE FOR TUNABLE INTERFACE CALI-BRATION" and in U.S. Pat. No. 7,080,288 entitled "METHOD AND APPARATUS FOR INTERFACE FAILURE SURVIVABILITY USING ERROR CORRECTION." The disclosures of the above-referenced U.S. Patents are incorporated herein by reference.

Figure 3:
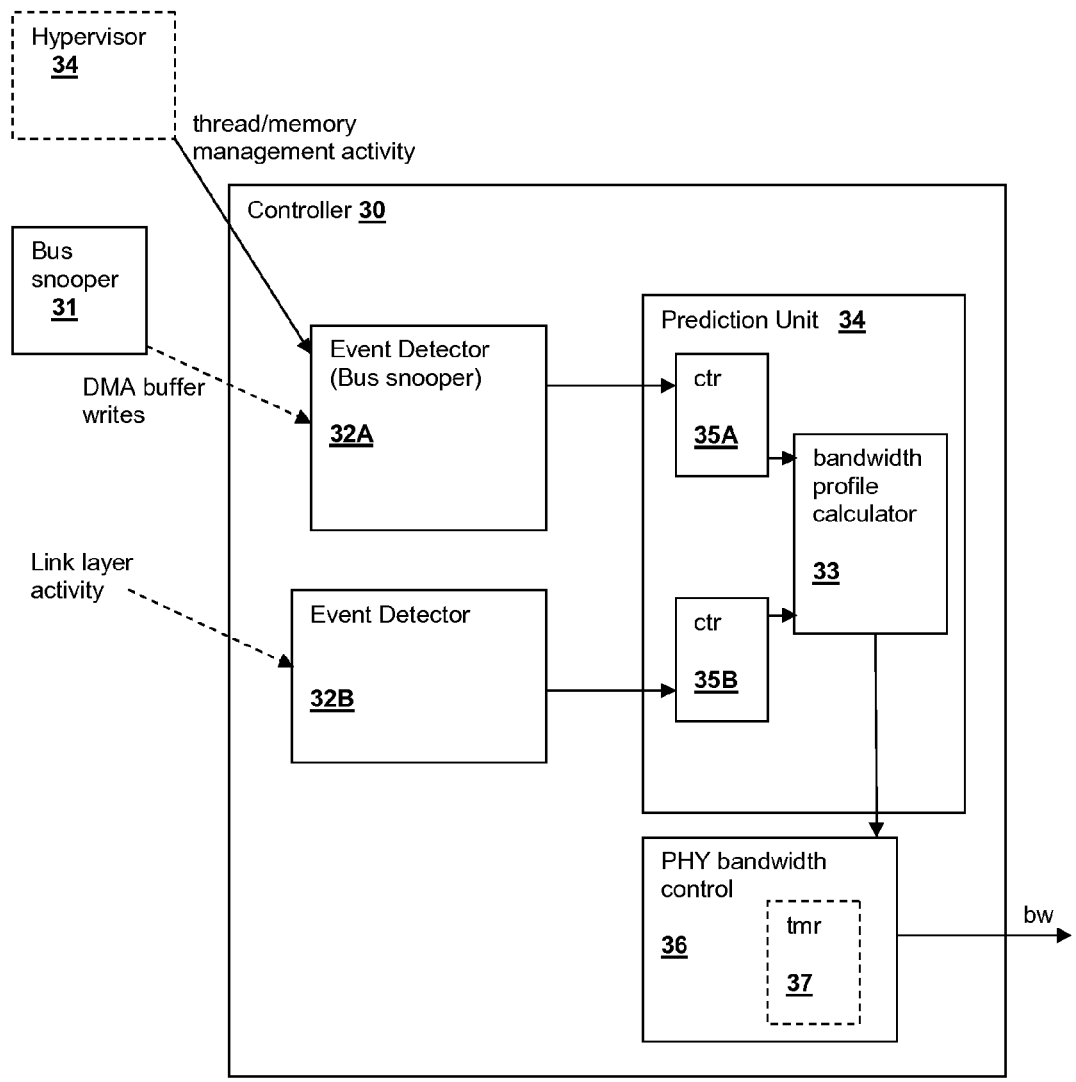
FIG. 3 is a block diagram of a controller 30 that can be used to implement controller 30A and/or 30B within processing unit 10A of FIGS. 1-2.

Referring now to FIG. 3, details of a controller 30 that may be used to detect events and predict future transactions on a physical layer of interface 11 is shown. Controller 30 may, for example, implement controller 30A within core 12 as shown in FIG. 2. Controller 30 is also provided only as one example of an architecture that may be implemented in discrete logic, for example as a state machine, or may be implemented in firmware or software as program instructions executed by core 12 or another processor within processing unit 10, such as a core within logical link layer 22 or a service processor coupled to core 12. As an example of a mechanism for detecting events, a bus snooper 31 observes transactions on an internal or external bus of core 12, such as a bus that couples core 12 to memory 14. In another example a hypervisor 34 reports thread state change or remote memory association events, such as the above-described connection between a thread executing within processing unit 10 and a remote memory. When an event detector 32A detects that a combination of events indicates a likelihood that a number of transactions will soon occur over interface 11, a counter 35A in prediction unit 34 is incremented. Similarly, another event detector 32B receives indications of activity at logical link layer 22 and determines whether to increment another counter 35B based on whether the activity indicates that a number of transactions will occur over interface 11. A bandwidth profile calculator 33 determines from the values of counters 35A and 35B, which may be periodically reset, or reset according to another mechanism, the bandwidth that is likely needed over interface 11. Bandwidth profile calculator 33 provides a control signal to a physical link layer bandwidth control circuit 36 that sets the operating frequency and/or width of the physical link layer of interface 11 appropriately to balance power consumption (or generated noise, etc., depending on the particular system criteria) with the bandwidth supplied over interface 11 for the transactions. A timer 37 is provided to restore the bandwidth to an initial value after a predetermined or programmable interval. In one exemplary implementation, timer 37 controls a time between intervals of full-bandwidth or partial-bandwidth operation as commanded by bandwidth profile calculator 33 and a low-power shutdown state. The width of the intervals can also be set by bandwidth profile calculator, so that interface 11 is cycled between the low-power state and the full-bandwidth or partial-bandwidth state in order to complete transactions that are allowed to accumulate in buffers 21 between the intervals of full-bandwidth or partial-bandwidth operation. In all of the cases above, the actual demand generated by I/O requests is generally combined with the predicted demand to determine an appropriate link bandwidth.

Figure 4:
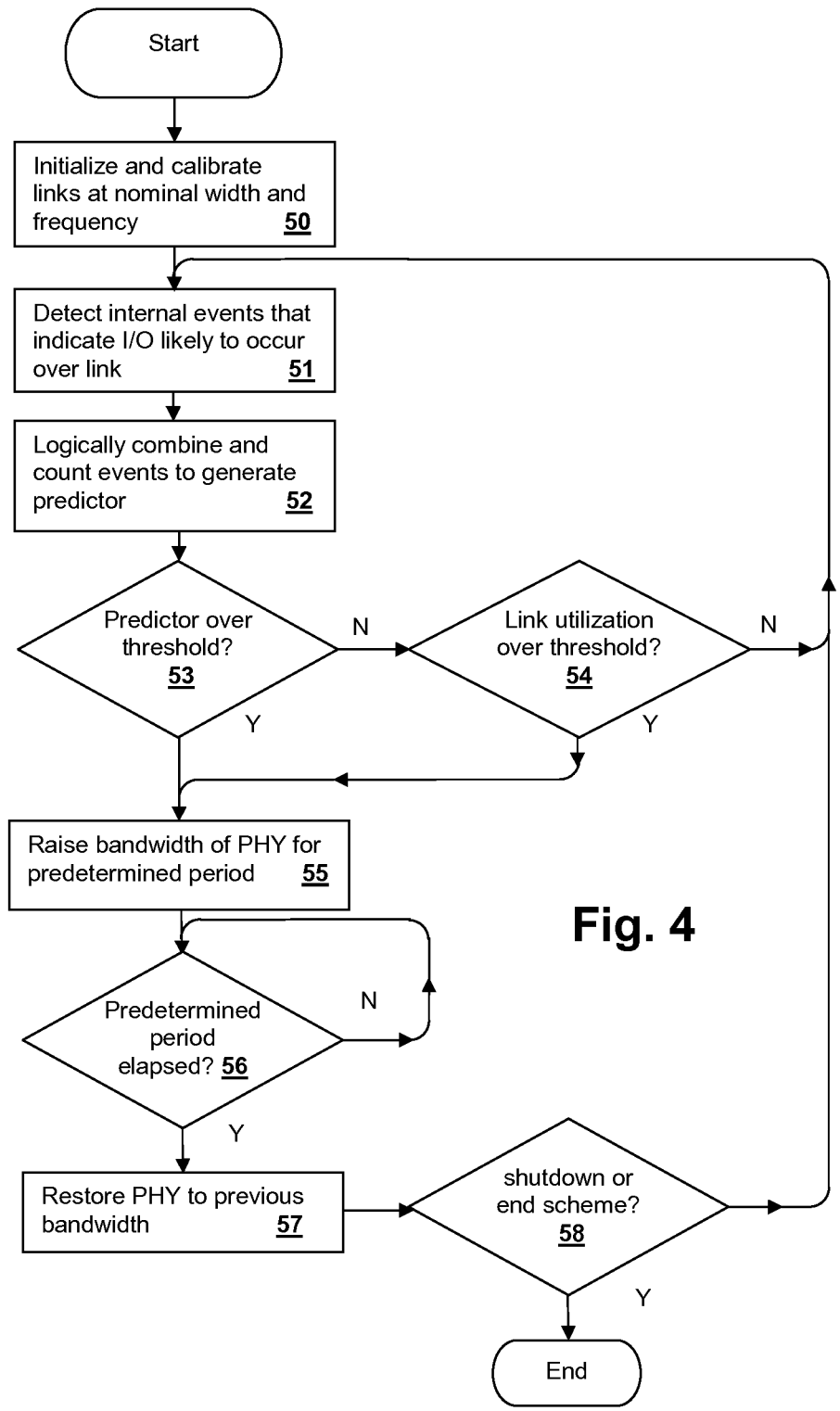
FIG. 4 is a flowchart showing an exemplary method of operating a processing system.

Referring now to FIG. 4, a method of operating a processing system is illustrated in a flowchart. First, interface links between processing units are initialized and calibrated at a nominal interface width and frequency (step 50). During operation, events are detected that indicate I/O is likely to occur over one or more of the links (step 51). The events are logically combined and counted to generate predictors that indicate a bandwidth that will be needed for the one or more links (step 52). Once the predictor is over a threshold value (decision 53) or the link utilization is over a threshold value (decision 54), the bandwidth of the physical layer (PHY) is raised for a predetermined time period (step 55). After the predetermined time period has elapsed (decision 56) the bandwidth of the physical layer is lowered to the previous bandwidth (step 57). Until the scheme is ended or the system is shut down (decision 58), steps 51-57 are repeated.

As noted above, portions of the present invention may be embodied in a computer program product, e.g., a program executed processors having program instructions that direct the operations outlined in FIG. 4, by controlling the interfaces of FIG. 2 and FIG. 3. The computer program product may include firmware, an image in system memory or another memory/cache, or stored on a fixed or re-writable media such as an optical disc having computer-readable code stored thereon. Any combination of one or more computer readable medium(s) may store a program in accordance with an embodiment of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of the present application, a computer readable storage medium may be any tangible medium that can contain, or store a program for use by or in connection with an instruction execution system, apparatus, or device. A computer-readable storage medium, as used herein, is not to be construed as being transitory signals per se, such as radio waves or other freely-propagating electromagnetic waves, electromagnetic waves propagating through a waveguide or other transmission media (e.g., light pulses propagating through a fiber-optic cable), or electrical signals transmitted through a wire. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A controller for controlling a dynamically adjustable bandwidth of a physical link layer of an external interface for interconnecting processing units, the controller comprising:
    an event detector for detecting multiple events other than I/O requests and bandwidth allocation requests occurring within a first one of the processing units that are indicative of potential future transactions on the interface;
    a traffic predictor that predicts, from the detected events, that future transactions will likely occur on the external interface, wherein the prediction of the traffic predictor is independent of observations of actual traffic on the external interface and requests for allocation of bandwidth on the external interface; and
    a control unit responsive to an output of the traffic predictor that controls the dynamically adjustable bandwidth of the first physical link layer to accommodate the future transactions by increasing the dynamically adjustable bandwidth of the first physical link layer, and subsequent to the future transactions occurring, restores the dynamically adjustable bandwidth of the first physical link layer to a lower value.

2. The controller of claim 1, wherein the event detector snoops an internal bus of the first processing unit to detect events indicative of the potential future transactions on the first external interface and counts the events detected by the snooping, wherein the event predictor compares the count to one or more thresholds to determine a quantity of the future potential transactions that may occur, and wherein the control unit controls the dynamically adjustable bandwidth to accommodate the quantity of future potential transactions.

3. The controller of claim 1, wherein the event detector comprises a hypervisor executing within the computer system that detects a system level event predictive of the future transactions and wherein the traffic predictor predicts the future transactions responsive to the hypervisor detecting the system level event.

4. The controller of claim 3, wherein the first external interface couples the first processing unit to a remote memory, wherein the hypervisor detects that an association between a thread executed by the first processing unit and the remote memory has become active.

5. The controller of claim 3, wherein the event detector is coupled to a trace array of the first processing unit, wherein the event detector reads state information that has been captured in the trace array and further uses the state information to detect the events indicative of the potential future transactions.

6. The controller of claim 1, wherein the event predictor computes a profile of a predicted utilization of the first interface and wherein the controlling controls the dynamically adjustable bandwidth in conformity with the shape of the predicted utilization.

7. The controller of claim 1, wherein responsive to an output of the traffic predictor indicating that the future transactions will occur, the control unit sets the dynamically adjustable bandwidth of the first physical link layer to a predetermined value during periodic intervals, and wherein responsive to an output of the traffic predictor indicating that the future transactions will not occur, the control unit sets the dynamically adjustable bandwidth of the first physical link layer to a minimum value.

8. The controller of claim 1, wherein the events are idle cycles of a logical link layer of the first interface internal to the first processing unit and coupled to the first physical link layer.

9. The controller of claim 1, wherein the control unit is within a bus arbiter of a link layer of the first interface internal to the first processing unit and coupled to the first physical link layer.

10. The controller of claim 1, wherein the control unit controls a width of the first physical link layer by setting a number of active signals used to transmit data in the first physical link layer to set the dynamically adjustable bandwidth.

11. The controller of claim 1, wherein the control unit controls a frequency of the first physical link layer to set the dynamically adjustable bandwidth.

12. A computer system comprising:
a plurality of processing units;
a plurality of interfaces having corresponding physical link layers with dynamically adjustable bandwidth that interconnect the processing units; and
a controller within at least a first one of the processing units for controlling the dynamically adjustable bandwidth of a first physical link layer of a first one of the interfaces, wherein the controller comprises an event detector for detecting multiple events other than I/O requests and bandwidth allocation requests occurring within the first one of the processing units that are indicative of potential future transactions on the first interface, a traffic predictor that predicts, from the detected events, that future transactions will likely occur on the first interface, wherein the prediction of the traffic predictor is independent of observations of actual traffic on the external interface and requests for allocation of bandwidth on the external interface, responsive to predicting that the future transactions will likely occur, and a control unit responsive to an output of the traffic predictor that controls the dynamically adjustable bandwidth of the first physical link layer to accommodate the future transactions by increasing the dynamically adjustable bandwidth of the first physical link layer, and subsequent to the future transactions occurring, restores the dynamically adjustable bandwidth of the first physical link layer to a lower value.

13. The computer system controller of claim 12, wherein the event detector snoops an internal bus of the first processing unit to detect events indicative of the potential future transactions on the first external interface, counts the events detected by the snooping, wherein the event predictor compares the count to one or more thresholds to determine a quantity of the future potential transactions that may occur, and wherein the control unit controls the dynamically adjustable bandwidth to accommodate the quantity of future potential transactions.

14. The computer system of claim 12, further comprising program instructions implementing a hypervisor executed by one or more of the processing units, wherein the hypervisor implements the event detector by detecting a system level event predictive of the future transactions and wherein the traffic predictor predicts the future transactions responsive to the hypervisor detecting the system level event.

15. The computer system of claim 14, wherein the first external interface couples the first processing unit to a remote memory, wherein the hypervisor detects that an association between a thread executed by the first processing unit and the remote memory has become active and in response, increases the dynamically adjustable bandwidth of the first physical link layer interface.

16. A computer program product comprising a computer-readable storage medium storing program instructions for execution by a computer system comprising a plurality of processing units coupled by external interfaces, the program instructions comprising program instructions for:
detecting multiple events other than I/O requests and bandwidth allocation requests occurring within a first one of the processing units that are indicative of potential future transactions on a first one of the external interfaces connected to the first processing unit that connects the first processing unit to another processing unit;
predicting, from the detected events, that future transactions will likely occur on the first external interface, wherein the predicting is independent of observations of actual traffic on the external interface and requests for allocation of bandwidth on the external interface;
responsive to predicting that the future transactions will likely occur, controlling the dynamically adjustable bandwidth of a first physical link layer corresponding to the first external interface to accommodate the future transactions by directly signaling a controller that controls the dynamically adjustable bandwidth of the physical link layer to increase increasing the dynamically adjustable bandwidth of the first physical link layer; and
subsequent to the future transactions occurring, restoring the dynamically adjustable bandwidth of the first physical link layer to a lower value.

17. The computer program product of claim 16, wherein the program instructions comprise program instructions implementing a hypervisor executed by one or more of the processing units, wherein the hypervisor implements the event detector by detecting a system level event predictive of the future transactions, and wherein the traffic predictor predicts the future transactions responsive to the hypervisor detecting the system level event.

18. The computer program product of claim 17, wherein the first external interface couples the first processing unit to a remote memory, wherein the program instructions implementing the hypervisor detect that an association between a thread executed by the first processing unit and the remote memory has become active, and in response, increases the dynamically adjustable bandwidth of the first physical link layer interface.

* * * * *